(12) United States Patent
Osuka

(10) Patent No.: US 11,336,802 B2
(45) Date of Patent: May 17, 2022

(54) IMAGING APPARATUS

(71) Applicant: Panasonic Intellectual Property Management Co., Ltd., Osaka (JP)

(72) Inventor: Kyosuke Osuka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 84 days.

(21) Appl. No.: 17/056,109

(22) PCT Filed: Jul. 23, 2019

(86) PCT No.: PCT/JP2019/028815
§ 371 (c)(1),
(2) Date: Nov. 17, 2020

(87) PCT Pub. No.: WO2021/014560
PCT Pub. Date: Jan. 28, 2021

(65) Prior Publication Data
US 2021/0168265 A1 Jun. 3, 2021

(51) Int. Cl.
*H04N 5/202* (2006.01)
*H04N 5/232* (2006.01)
*H04N 5/243* (2006.01)

(52) U.S. Cl.
CPC ....... *H04N 5/202* (2013.01); *H04N 5/232933* (2018.08); *H04N 5/232939* (2018.08); *H04N 5/243* (2013.01)

(58) Field of Classification Search
CPC ............. H04N 5/202; H04N 5/232933; H04N 5/232935; H04N 5/232939; H04N 5/243; H04N 9/69
See application file for complete search history.

(56) References Cited

U.S. PATENT DOCUMENTS

2010/0123803 A1* 5/2010 Ooba .............. H04N 9/77
348/234
2015/0287216 A1 10/2015 Baker
2017/0366729 A1 12/2017 Itoh

FOREIGN PATENT DOCUMENTS

JP 2005-295500 A 10/2005
JP 2006-165716 A 6/2006
(Continued)

OTHER PUBLICATIONS

International Preliminary Report on Patentability of related International Application No. PCT/JP2019/028815 dated Jan. 25, 2022 (English translation).
(Continued)

*Primary Examiner* — Daniel M Pasiewicz
(74) *Attorney, Agent, or Firm* — Renner, Otto, Boisselle & Sklar, LLP

(57) ABSTRACT

An imaging apparatus includes: an imager to capture a subject image to generate an image signal; an image processor to perform predetermined processing on the image signal to generate image data; a display to display luminance level information showing a luminance level in the image; an operation receiver to input a user operation; and a controller to control the display and the operation receiver. The image processor generates the image data using a predetermined gamma curve in which a light amount in the image signal is associated with a luminance level to compress as the light amount increases. When the operation receiver receives a user operation for setting a luminance level in the luminance level information, the controller controls the display to represent the luminance level by a stop number indicating a scaling rate of a corresponding light amount in the gamma curve.

8 Claims, 9 Drawing Sheets

(56) References Cited

FOREIGN PATENT DOCUMENTS

| JP | 2008-054115 A | 3/2008 |
| JP | 2015-201849 A | 11/2015 |
| JP | 2017-229058 A | 12/2017 |
| JP | 2018-148425 A | 9/2018 |

OTHER PUBLICATIONS

International Search Report for corresponding Application No. PCT/JP2019/028815, dated Oct. 8, 2019.
Written Opinion for corresponding Application No. PCT/JP2019/028815, dated Oct. 8, 2019.
International Search Report for corresponding Application No. PCT/JP2019/028815, dated Oct. 8, 2019, English translation.

* cited by examiner

FIG. 8

| CANDIDATE VALUE FOR REFERENCE | D1 |
|---|---|
| −8 | |
| −7 | |
| −6 | |
| ⋮ | |
| 0 | |
| 0.2 | |
| 0.4 | |
| 0.6 | |
| ⋮ | |
| 7 | |

FIG. 9

| CANDIDATE VALUE FOR WIDTH | D2 |
|---|---|
| ±0.2 | |
| ±0.4 | |
| ±0.6 | |
| ⋮ | |
| ±1.0 | |

IMAGING APPARATUS

TECHNICAL FIELD

The present disclosure relates to an imaging apparatus that performs image shooting using a specific gamma curve such as a log gamma curve in log shooting.

BACKGROUND ART

Patent Document 1 discloses a waveform monitor for monitoring an output signal waveform of a camera when adjusting lighting of a shooting scene or a gain or aperture of the camera. The waveform monitor generates a modified image from an original image by the camera. In the waveform monitor, a brightness measuring system generates a brightness value of a pixel of the original image and converts it to an f-stop equivalent. A cursor window select block generates a range of f-stop values. With a color cursor mixer, pixels that fall within the range of f-stop values in the original image are selectively colored with a pseudo color and displayed as the modified image.

CITATION LIST

Patent Document

Patent Document 1: JP 2015-201849 A

SUMMARY

Technical Problem

The present disclosure provides an imaging apparatus capable of facilitating adjustment of lighting, exposure adjustment, or the like when a user performs shooting using a specific gamma curve.

Solution to Problem

In the present disclosure, an imaging apparatus includes an imager to capture a subject image to generate an image signal, an image processor to perform predetermined processing on the image signal generated by the imager to generate image data indicating an image, a display to display luminance level information showing a luminance level in the image, an operation receiver to input a user operation, and a controller to control the display and the operation receiver. The image processor generates the image data by using a predetermined gamma curve in which a light amount included in the image sign is associated with a luminance level to compress as the light amount increases. The controller, when causing the operation receiver to receive a user operation for setting a luminance level in the luminance level information, controls the display to represent the luminance level by a stop number indicating a scaling rate of a corresponding light amount in the gamma curve.

According to the imaging apparatus of the present disclosure, it is possible to facilitate adjustment such as exposure adjustment when a user performs shooting using a specific gamma curve.

BRIEF DESCRIPTION OF THE DRAWINGS

FIG. 8 is a diagram illustrating a reference value table in the digital camera.

FIG. 9 is a diagram illustrating a width value table in the digital camera.

DESCRIPTION OF EMBODIMENTS

Hereinafter, embodiments will be described in detail with reference to the drawings as appropriate. However, more detailed description than necessary may be omitted in some cases. For example, detailed descriptions of already well-known matters and repeated descriptions for substantially the same configuration may be omitted in some cases. This is to avoid unnecessarily redundancy in the following description from and to facilitate understanding by those skilled in the art. In addition, the inventor provides the accompanying drawings and the following description in order for those skilled in the art to understand the present disclosure sufficiently, and it is not intended to limit the subject matter described in the claims by these.

First Embodiment

In the first embodiment, a digital camera as an example of an imaging apparatus according to the present disclosure will be described.

1. Configuration

The configuration of the digital camera according to the first embodiment will be described with reference to FIG. 1.

Figure 1:
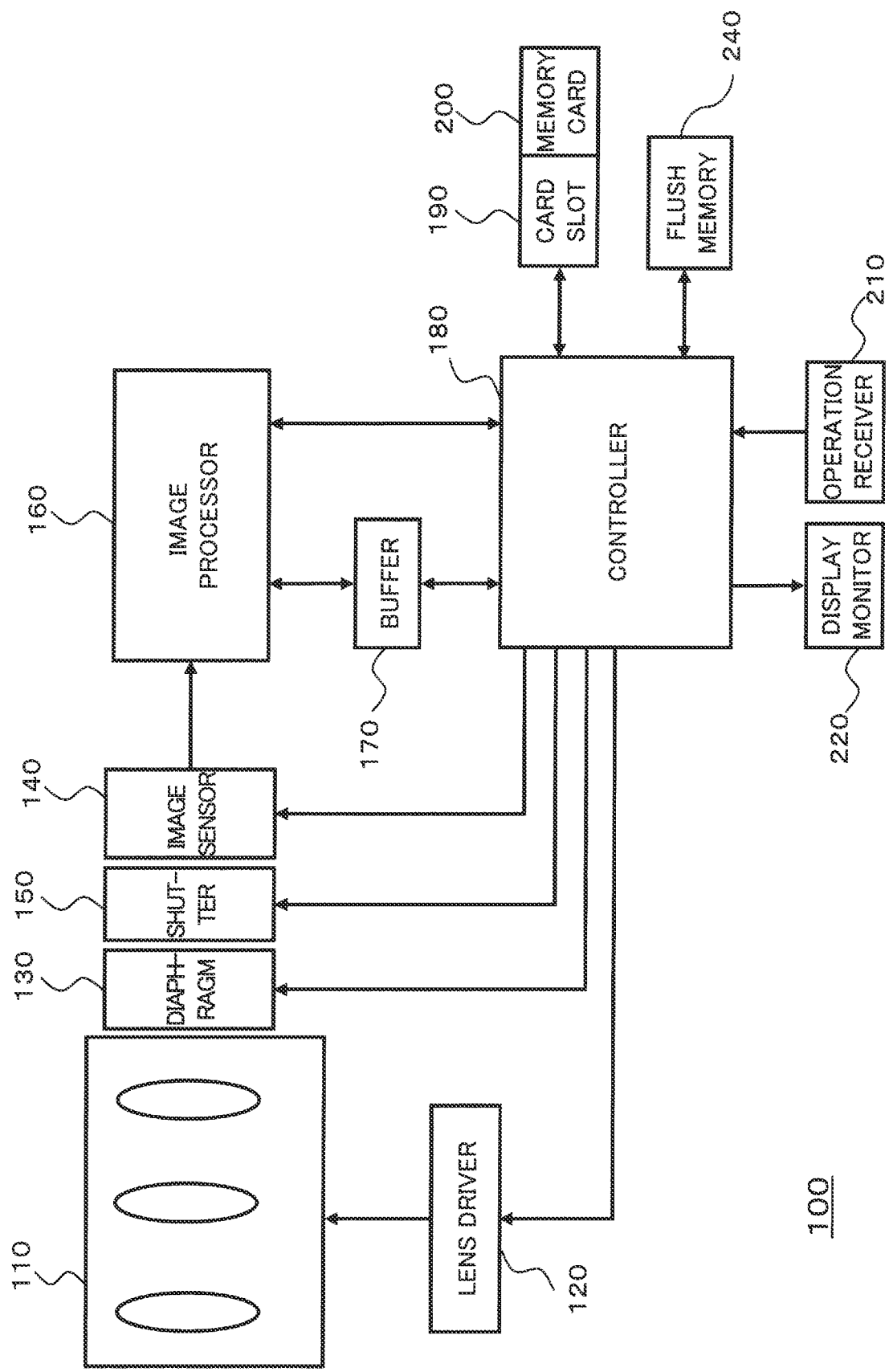
FIG. 1 a diagram showing a configuration of a digital camera according to a first embodiment of the present disclosure.

FIG. 1 is a diagram showing a configuration of a digital camera 100 according to the present embodiment. The digital camera 100 according to this embodiment includes an optical system 110, a lens driver 120, a diaphragm 130, and an image sensor 140. Further, the digital camera 100 includes a shutter 150, an image processor 160, a buffer memory 170, a controller 180, an operation receiver 210, and a display monitor 220. Furthermore, the digital camera 100 includes a flash memory 240 and a card slot 190.

The optical system 110 includes a zoom lens, a focus lens, and the like. The zoom lens is a lens for changing the magnification of a subject image formed by the optical system. The focus lens is a lens for changing the focus state of the subject image formed on the image sensor 140. Each of the zoom lens and the focus lens is composed of one or a plurality of lenses.

The lens driver 120 includes a configuration for driving various lenses of the optical system 110 such as a focus lens. For example, the lens driver 120 includes a motor, to move the focus lens along an optical axis of the optical system 110 based on the control of the controller 180. The configuration for driving the focus lens in the lens driver 120 can be implemented by a DC motor, a stepping motor, a servo motor, an ultrasonic motor, or the like.

The diaphragm 130 is composed of an aperture stop, for example. The diaphragm 130 adjusts an amount of light transmitted via the aperture by adjusting the size of the aperture automatically or according to the user setting to designate the f-number (diaphragm value) or the like. The optical system 110 and the diaphragm 130 are housed in a lens barrel (not shown).

The image sensor 140 captures a subject image incident through the optical system 110 to generate an image signal. The image signal includes information on the amount of light exposed for each pixel by the image sensor 140, and indicates an image of the imaging result. The generated image signal is digitized by an AD converter (not shown), for example, and input to the image processor 160.

The image sensor 140 generates image data of a new frame at a predetermined frame rate (for example, 30 frames/second). A generation timing of the image data and an electronic shutter operation in the image sensor 140 are controlled by the controller 180. As the image sensor 140, various image sensors such as a CMOS image sensor, a CCD image sensor, or an NMOS image sensor can be used.

The image sensor 140 performs a still image capturing operation, a through image capturing operation, and the like. The through image is mainly a moving image, and is displayed on the display monitor 220 in order for the user to determine a composition for capturing a still image. The image sensor 140 is an example of an imager in the present embodiment.

The shutter 150 is a means for blocking the light transmitted to the image sensor 140. The shutter 150 is composed of a mechanical shutter such as a focal plane shutter or a lens shutter. The shutter 150 is driven at a shutter speed set by a user operation or the like.

The image processor 160 performs predetermined processing on the image signal output from the image sensor 140 to generate image data, or performs various processing on the image data to generate an image to be displayed on the display monitor 220. The predetermined processing is, for example, gamma processing described later. Examples of the processing of the image processor 160 include, but are not limited to, white balance correction, gamma correction (inverse gamma processing), YC conversion processing, electronic zoom processing, compression processing, expansion processing, and the like. The image processor 160 may be configured by a hard-wired electronic circuit, or may be configured by a microcomputer using a program, a processor, or the like.

The display monitor 220 is an example of a display that displays various information. For example, the display monitor 220 displays an image (through image) indicated by image data captured by the image sensor 140 and subjected to image processing by the image processor 160. Further, the display monitor 220 displays a menu screen or the like for the user to make various settings for the digital camera 100. The display monitor 220 can be configured by, for example, a liquid crystal display device or an organic EL device.

The operation receiver 210 is a general term for operation receivers that receive an operation (instruction) from a user. The operation receiver 210 includes a button, a lever, a dial, a touch panel, a switch, and the like that receive user operations. The operation receiver 210 also includes virtual buttons and icons displayed on the display monitor 220. A specific example of the operation receiver 210 will be described later.

The card slot of 190 is mountable with the memo card 200 and accesses the memory card 200 based on control from the controller 180. The digital camera 100 can record image data on the memory card 200 and read the recorded image data from the memory card 200.

The controller 180 controls the whole operation of the digital camera 100. The controller 180 uses the buffer memory 170 as a work memory during control operations and image processing operations.

The controller 180 includes a CPU or MPU, and a predetermined function is realized by the CPU or MPU executing a program (software). The controller 180 may include a processor configured by a dedicated electronic circuit designed to realize a predetermined function, instead of the CPU or the like. That is, the controller 180 can be realized by various processors such as a CPU, MPU, CPU, DSU, FPGA, and ASIC. The controller 180 may be composed of one or a plurality of processors.

The buffer memory 170 is a recording medium that functions as a work memory for the image processor 160 and the controller 180. The buffer memory is implemented with a DRAM (Dynamic Random Access Memory) or the like. The flash memory 240 is a non-volatile recording medium. For example, the flash memory 240 stores various data structures (described later) for managing the operation mode of the digital camera 100 in the present embodiment. Each of the memories 170 and 240 is an example of a memory in the present embodiment.

1-1. Operation Receiver

Figure 2:
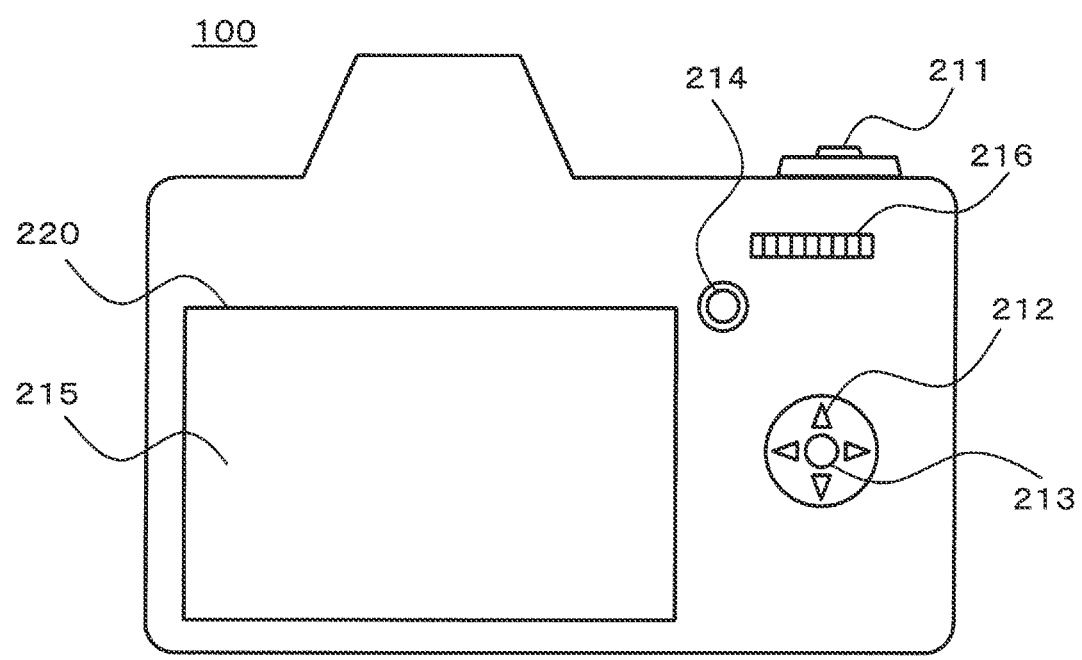
FIG. 2 is a view showing a back of the digital camera.

A specific example of the operation receiver 210 will be described with reference to FIG. 2. FIG. 2 is a view showing the back of the digital camera 100.

FIG. 2 shows, as an example of the operation receiver 210, a still image release button 211, selection buttons 212, a determination button 213, a moving image release button 214, a touch panel 215, and a dial 216. The operation receiver 210, when receiving an operation of the user, transmits various instruction signals to the controller 180.

The still image release button 211 is a two-stage depression type button. When the still image release button 211 is half-depressed by the user, the controller 180 executes autofocus control (AF control), auto exposure control (AE control), or the like. When the still image release button 211 is fully depressed by the user, the controller 180 records image data captured at the timing of depression operation as a recorded image in the memory card 200 or the like.

The selection buttons 212 are depression type buttons provided in the up/down/left/right directions. The user can select various condition items displayed on the splay monitor 220 or move the cursor by depressing one of the selection buttons 212 in the up/down/left/right directions.

The determination button 213 is a depression type button. When the determination button 213 is depressed by the user with the digital camera 100 being in a shooting mode or a playback mode, the controller 180 displays a menu screen on the display monitor 220. The menu screen is a screen for setting various conditions for shooting/playback. When the determination button 213 is depressed with a setting item for various conditions selected, the controller 180 determines the setting the selected item.

The moving image release button 214 is depression type button for starting and ending moving mage recording. When the moving image release button 214 is depressed with no moving image being recorded, the digital camera 100 starts a moving image recording operation. When the moving image release but 214 is depressed with a moving image being recorded, the digital camera 100 ends the moving image recording operation.

The touch panel 215 is arranged so as to superimpose with the display screen of the display monitor 220, and detects a touch operation on the display screen by the user's finger. As a result, the user can perform operations such as designation of an area for the linage displayed on the display monitor 220 and various selections on the menu screen.

The dial 216 is a rotary operation member. The dial 216 may be used for exposure adjustment, for example. For example, one or more of the diaphragm value, shutter speed, and ISO sensitivity can be changed by rotating the dial 216.

2. Operation

The operation of the digital camera 100 configured as described above will be described below.

The digital camera 100 of the present embodiment has a log shooting mode that is an operation mode used on the premise that a user completes a final video work in post-processing after shooting of a moving image. According to the log shooting mode, it is possible to reduce the loss of information at the tame of shooting and preserve the amount of information to be reproduced in the video work by post-processing color grading or the like.

In an image shooting operation of the log shooting mode or the like, the digital camera 100 generates image data y performing gamma processing on the image signal indicating the imaging result by the image sensor 140 in the image processor 160. The gamma processing converts the light amount of each pixel in the image signal into a luminance level in the image data according to a gamma curve indicating a preset correspondence between an input (light amount) and output (luminance level).

The log shooting mode employs a log gamma curve for gamma processing in a shooting operation of a moving image, but omits image processing other than the gamma processing. The image data after the gamma processing is temporarily stored in the buffer memory 170, for example, displayed as a through image on the display monitor 220 or recorded in the flash memory 240 according to the user operation of the shooting instruction under the control of the controller 180.

2-1. Log Gamma Curve

Figure 3:
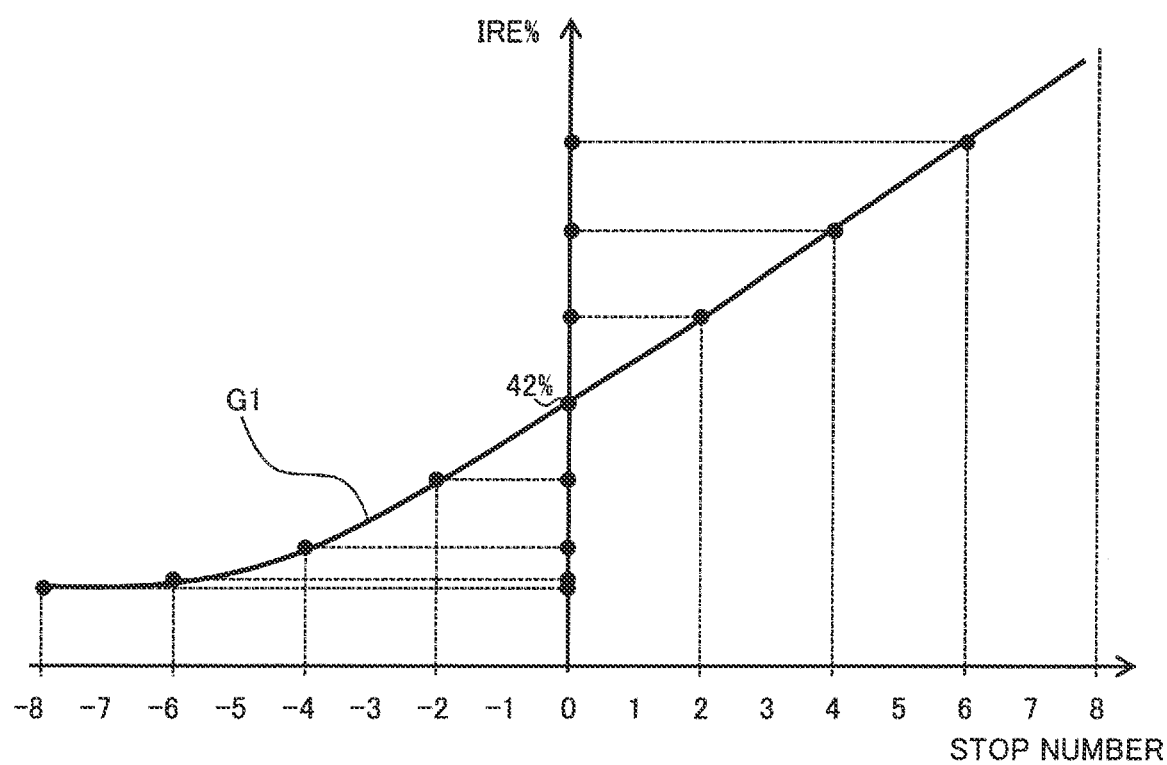
FIG. 3 is a graph illustrating a log gamma curve in the digital camera.

The log gamma curve is an example of a gamma curve designed to have a characteristic of log function. FIG. 3 illustrates a log gamma curve G1 in the digital camera 100 of the present embodiment.

The log gamma curve G1 is designed in view of preserving information, which humans tend to perceive in the final video work, at the time of shooting effectively within the capability of the digital camera 100, based on the property of the human eye that it is more sensitive to changes in middle gradations such as gray than changes in bright gradations such as white. The capability of the digital camera 100 taken into account include, for example, the dynamic range of the image sensor 140, the amount of recordable image data, and the like.

In the graph of FIG. 3, the vertical axis indicates the luminance level of the output image data (video signal) in units of IRE (Institute of Radio Engineers) % as a video signal output percentage. The horizontal axis indicates the stop number for a light amount in the image signal input from the image sensor 140.

The stop number indicates a scaling rate with reference to a light amount presumed as a standard middle gray (so-called 18% gray), and is represented by a binary logarithm ($\log_2$). That is, a positive number of stops indicates a scaling rate for increasing the light amount in a power of two. A negative number of stops indicates a scaling rate for decreasing the light amount in a power of ½.

In the example of FIG. 3, the luminance level at 0 stop of the log gamma curve G1 is set to IRE 42%. In this example, it is assumed that the dynamic range of the image sensor 140 ranges from −8 to 7 stops.

As shown in FIG. 3, the log gamma curve G1 has a linear portion a range where stop number is positive. The linear portion with the stop number as the horizontal axis is approximate to the log function as a function of the corresponding light amount. In this way, the log gamma curve G1 associates the light amount with the luminance level (IRE 42% or more) to compress as the light amount is larger than that of the middle gray.

On the other hand, range where the stop number is negative (less than IRE 42%), the log gamma curve G1 has a curved portion that converges to the lower limit of the luminance level. For the light amount near 0 stop, a luminance level assignee so as to leave a relatively large amount of information. The luminance level of 0 stop in the log gamma curve G1 is not particularly limited to IRE 42%, and can be changed as appropriate according to various design specifications.

2-2. Exposure Adjustment and Zebra Displaying Function

Figure 4A:
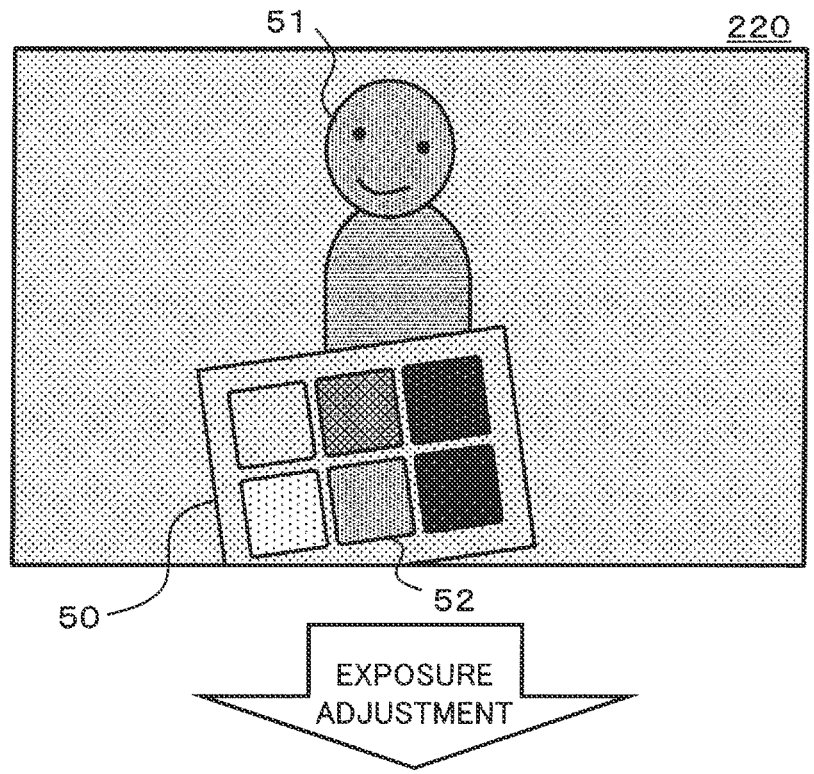
FIG. 4A is a diagram showing a display example before exposure adjustment in a log shooting mode of the digital camera.
Figure 4B:
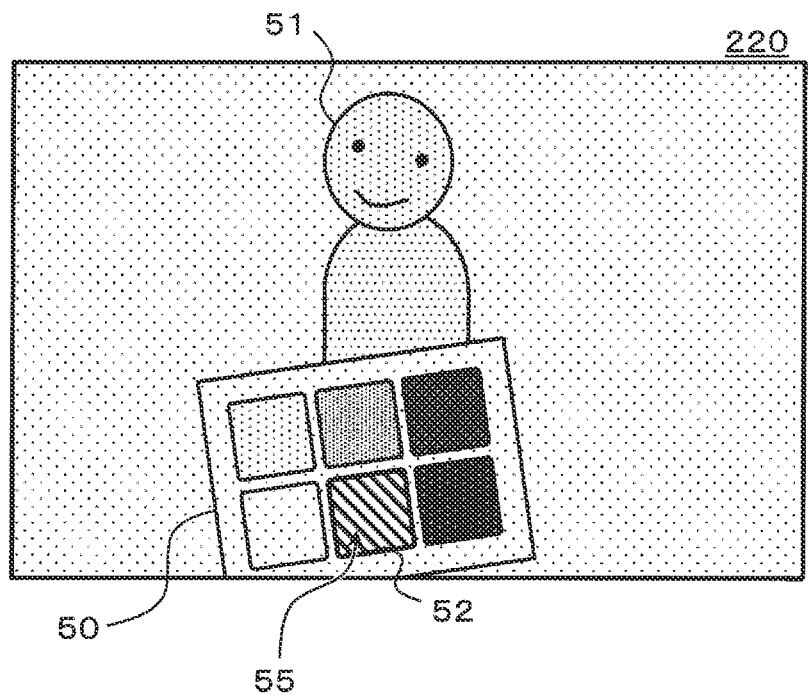
FIG. 4B is a diagram showing a display example after expos adjustment from the state of FIG. 4A.

FIGS. 4A and 4B are used to explain exposure adjustment performed by a user when using the log shooting mode based on the log gamma curve G1 as described above, and a function (zebra displaying function) of the digital camera 100 that assists the exposure adjustment of the user.

The digital camera 100 of this embodiment has a zebra displaying function that is available in the case where the user performs exposure adjustment according to the shooting environment, for example. The zebra displaying function is an example of a luminance level displaying function, which displays a zebra pattern in an area having a preset luminance level on the through image of the display monitor 220, for example (see FIG. 4B).

The luminance level for the zebra displaying function can be set in a setup menu or the like (described later). For the zebra displaying function, a method of displaying the zebra pattern for a skin color of the subject person could be considered with setting the corresponding luminance level in a range such as IRE 70 to 80%, for example.

FIG. 4A shows a display example of the display monitor 220 before expo sure adjustment in the log shooting mode. In this display example, the subject person 51 and a color chart 50 are shown in the through image of the display monitor 220. In the log shooting mode, the appearance of the through image is unlike the final video work, faded or darkened. In such a case, the method of displaying the zebra pattern on the skin color of the person as described above is conceivable to be difficult to appropriately perform exposure adjustment due to the difference in the appearance of the skin color.

In contrast to this, by using the color chart. 50 or the like having a middle gray area 52 colored to a predetermined reflectance (18%), exposure adjustment can be appropriately performed regardless of the above appearance. FIG. 4B shows a display example after such exposure adjustment from the state of FIG. 4A.

At the exposure adjustment of FIGS. 4A and 4B, the user sets the luminance level for displaying the zebra pattern in advance, and then adjusts various parameters for exposure in the digital camera 100 until the zebra pattern 55 is displayed in the middle gray area 52 on the through image. The various parameters are a diaphragm value, a shutter speed, an ISO sensitivity, and the like. In the example of FIG. 3, setting the luminance level of the zebra pattern to include IRE 42% could realize exposure adjustment for effectively using the dynamic range of the digital camera 100.

As to the above, the conventional zebra displaying function employs IRE % definitions to a user interface that receives an operation of the user for selecting a luminance level to set the luminance level of the zebra pattern, the IRE % definitions being that a luminance level as the selecting option is displayed in units of IRE %. Thus, it is difficult to accurately perform the exposure adjustment described above when the user does not have a prior knowledge of the detailed specification of the log gamma curve, the prior knowledge in the example of FIG. 3 being that IRE 42% is a luminance level corresponding to the middle gray, for example.

Further, the luminance level corresponding to the middle gray is not limited to IRE 42%, and varies depending on, for example, various manufacturers of digital cameras and various specifications of the log gamma curve. For this reason, a user who uses a digital camera for the first time, or a user who uses multiple digital cameras from various manufacturers, is obstructed from accurately performing exposure adjustment in the log shooting mode, resulting in a hindrance to full utilization of the performances of the digital camera.

To solve this, in the present embodiment, a stop definition using the stop number associated with the luminance level in the log gamma curve G1 is adopted for the user interface to set the luminance level of the zebra pattern. According to this, the user can easily achieve the above-described accurate exposure adjustment only with general knowledge that the stop number corresponding to the middle gray is 0 stop, which is common sense when using the log shooting mode, for example.

Hereinafter, an operation (user interface) to set the luminance level in the digital camera 100 of the present embodiment will be described.

2-4. Luminance Level Setting Operation

The luminance level setting operation in the digital camera 100 of this embodiment will be described with reference to FIGS. 5 to 6B. Hereinafter, an example in which the luminance level for displaying the zebra pattern is set to have a width will be described.

Figure 5:
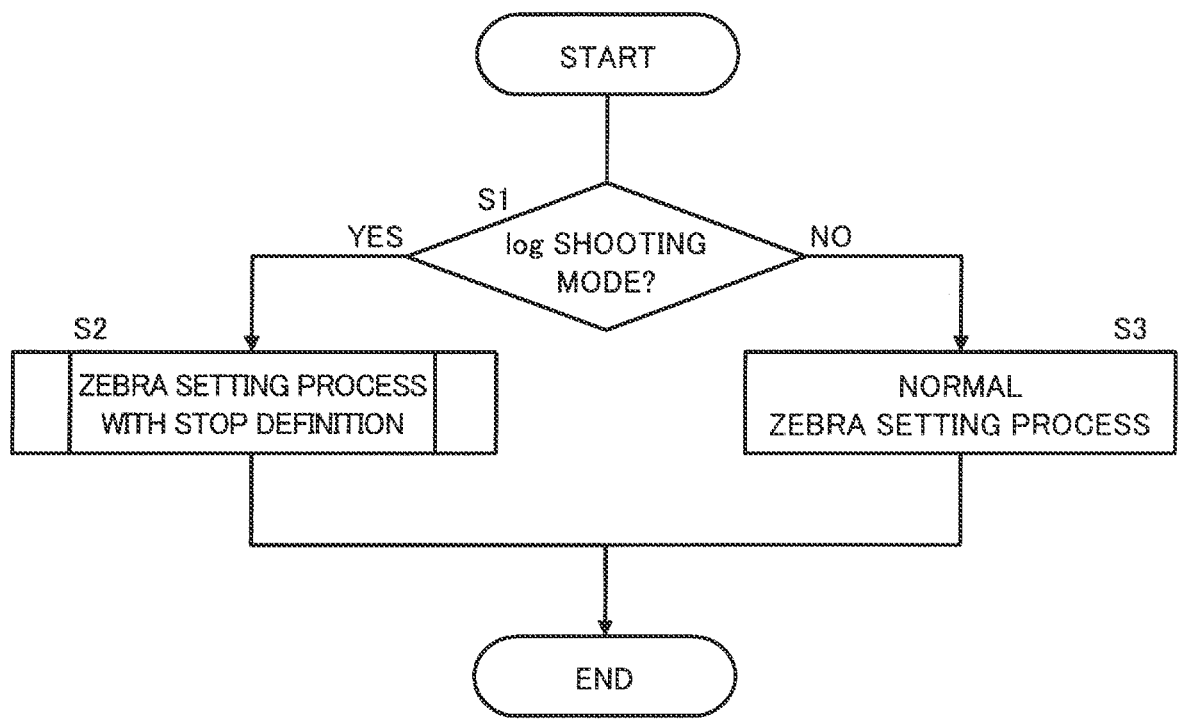
FIG. 5 a flowchart illustrating an example of a luminance level setting operation the digital camera.
Figure 6A:
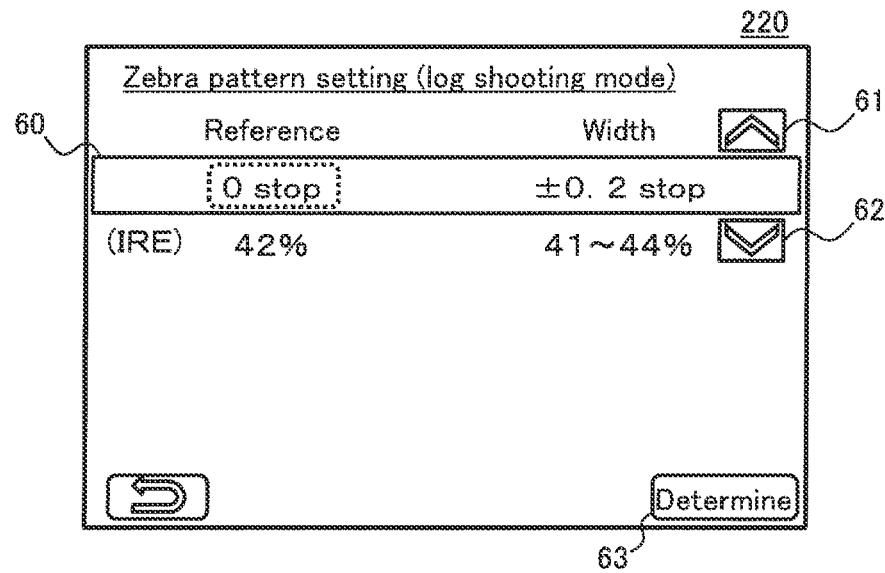
FIG. 6A a diagram showing a display example of a luminance level setting screen in a case of the log shooting mode.

FIG. 5 is a flowchart illustrating an example of the luminance level setting operation. FIG. 6A shows a display example of a luminance level setting screen in the case of the log shooting mode. FIG. 6B shows a display example of a luminance level setting screen in the case other than the log shooting mode.

The processing shown in the flowchart of FIG. 5 starts, for example, when a predetermined menu item related to the zebra displaying function is selected by a user operation on a menu screen displayed on the display monitor 220. Each process shown in this flowchart is executed by the controller 180 of the digital camera 100.

At first, the controller 180 determines whether or not the shooting mode currently set for the digital camera 100 is the log shooting mode (S1).

When determining that the shooting mode of the digital camera 100 is the log shooting mode (YES in S1), the controller 180 performs a zebra setting process with the stop definition (S2). The zebra setting process with the stop definition (S2) is a process of presenting the luminance level to be set by adopting the stop definition as described above, and setting the luminance level of the zebra pattern according to the user operation. The process of step S2 will be described later.

A display example of step S2 is illustrated in FIG. 6A. The display monitor 220 displays a luminance level selection column 60, change buttons 61 and 62, a determination button 63, and the like. In the process of step S2, the controller 180 causes the luminance level selection column 60 to display candidate values for the luminance level be set by the stop definition.

In the example of FIG. 6A, with the luminance level having a width, "0 stop" is displayed as the candidate value for the reference and "±0.2 stop" is displayed as the candidate value for the width. In this case, the luminance level set as a target for displaying the zebra pattern corresponds to a range of "0±0.2 stop" in the log gamma curve G1.

In this example, as illustrated in FIG. 6A, the controller 180 also controls to display, together with the selection column 60 for the luminance level, the value IRE % corresponding to the luminance level of the stop definition displayed in the selection column 60 (S2). This makes it easy for the user to understand the correspondence between the stop definition and the IRE % definition regarding the luminance level to the set.

On the other hand, when determining that the shooting mode of the digital camera 100 is not the log shooting mode (NO in S1), the controller 180 performs a normal zebra setting process (S3). The normal zebra setting process is a process for setting the luminance level of the zebra pattern according to the user operation in the IRE % definition without particularly using the stop definition.

Figure 6B:
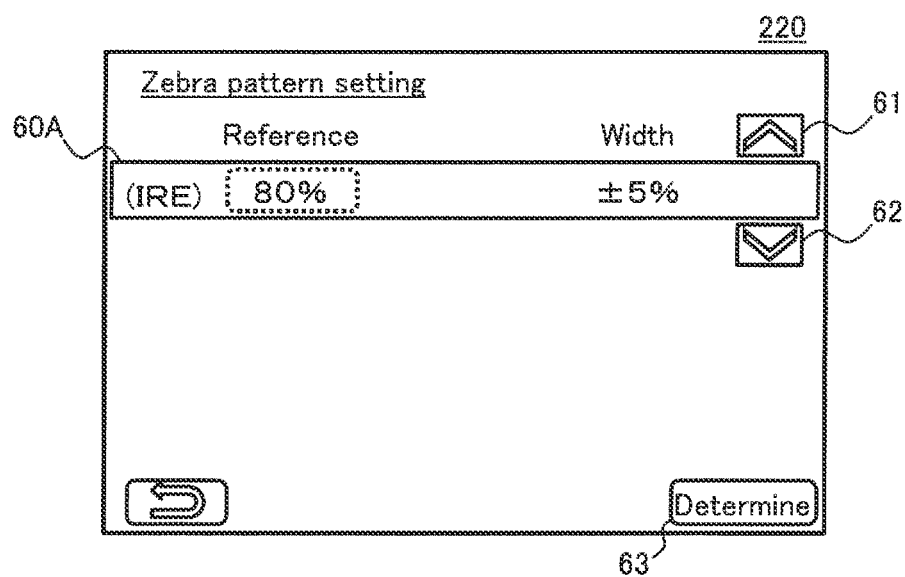
FIG. 6B is a diagram showing a display example of the luminance level setting screen in a case other than the log shooting mode.

A display example of step S3 is illustrated in FIG. 6B. In this display example, the controller 180 causes a luminance level selection column 60A to display the luminance level in units of IRE % (S3). Thus, in this embodiment, when the luminance level is set in a shooting mode other than the log shooting mode, the luminance level to be set by the IRE % definition is presented to the user.

When the setting process is completed in step S2 or step S3, the controller 180 transitions the setting screen of the display monitor 220 to the original menu screen or the like, and ends the processing shown in this flowchart.

According to the luminance level setting operation described above, in the case the log shooting mode is used (YES in S1), the digital camera 100 according to the present embodiment provides a user interface to perform setting of the luminance level displaying function such as the zebra displaying function in the stop definition (S2).

On the other hand, in the case other than the log shooting mode (NO in S1), the setting of the luminance level displaying function is performed in the IRE % definition (S3). The processing in step S3 can be performed without particularly using information on the gamma curve used in the current shooting mode. In the shooting mode in this case, for example, the image processor 160 can perform various image correction processes after the gamma processing to record image data with improved visibility. In addition, the gamma curve used for this gamma processing is separately prepared in the flash memory 240 or the like so as not to have the log function characteristics like the log gamma curve G1, for example.

After the luminance level (reference and width) of the zebra pattern is set by the luminance level setting operation as the above, a zebra pattern is displayed on the area, whose luminance is within the width of the set luminance level with respect to the reference, in the through image during use of the zebra displaying function (see FIG. 4B). At this time, the image processor 160 detects, for example, an area having the set luminance level in the image data after the gamma processing, and synthesizes the zebra pattern on the detected area. Alternatively, such detection may be performed before the gamma processing.

2-4-1. Zebra Setting Process of Stop Definition

The zebra setting process with the stop definition in step S2 of FIG. 5 will be described with reference to FIGS. 7 to 10.

Figure 7:
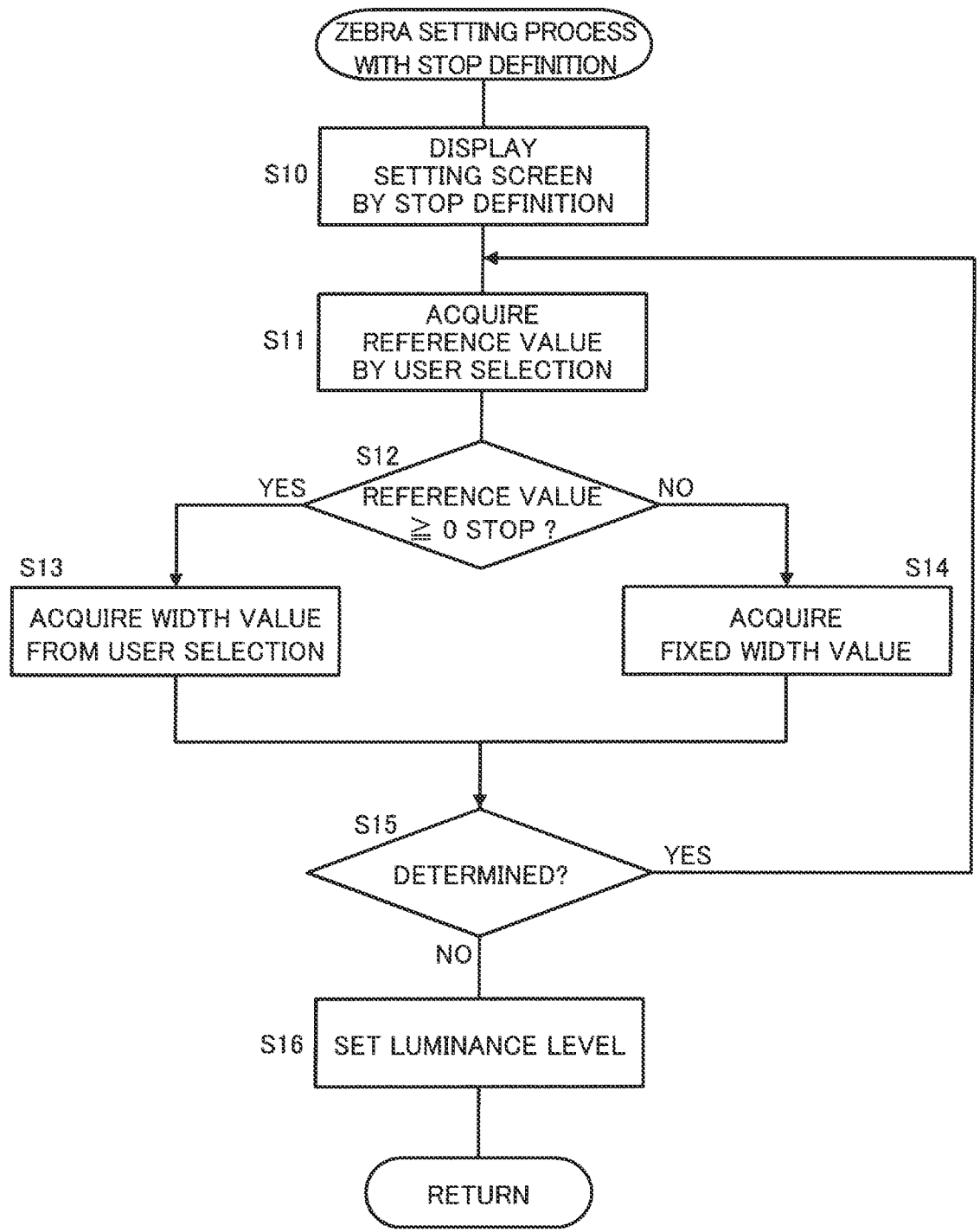
FIG. 7 is a flowchart illustrating a zebra setting process of a stop definition.
Figure 10:
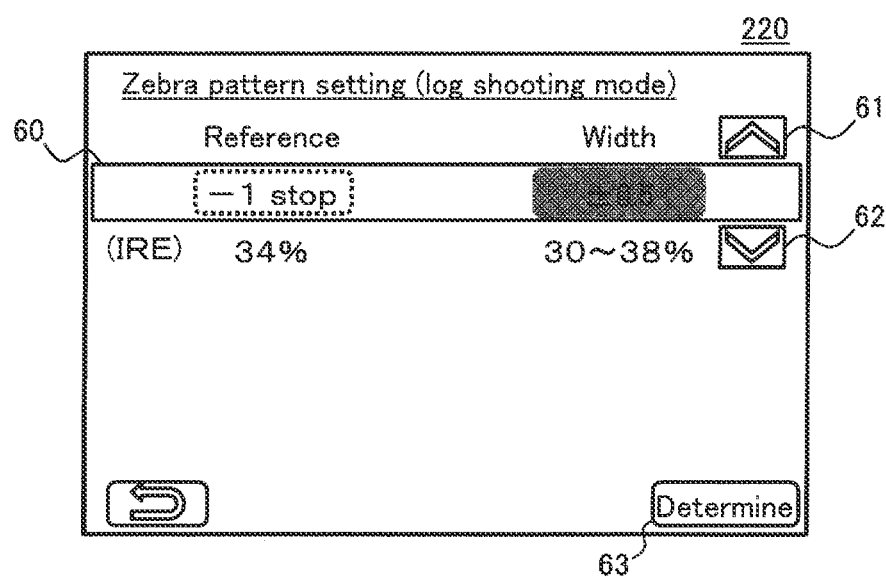
FIG. 10 is a diagram showing another display example of the luminance level setting screen in the case of the log shooting mode.

FIG. 7 is a flowchart illustrating the zebra setting process with the stop definition. FIG. 8 is a diagram illustrating a reference value table D1 in the digital camera 100. FIG. 9 illustrates a width value table. Each table D1, D2 is stored in advance in the flash memory 240, for example. FIG. 10 shows another display example of the luminance level setting screen in the case of the log shooting mode.

In the flow of FIG. 7, the controller 180 first causes the display monitor 220 to display a luminance level setting screen by the stop definition, as illustrated in FIG. 6A (S10).

The controller 180 receives a user operation in the operation receiver 210 during display of the setting screen of FIG. 6A, to acquire a reference value selected by the user operation from the candidate values for the reference (S11). FIG. 8 illustrates the reference value table D1.

The reference value table D1 is a table for managing candidate values for the reference that can be selected in step S11. In this example, when the reference value is 0 stop or more, the reference value can be set in increments of 0.2 stop, as shown in FIG. 8. On the other hand, when the reference value is less than 0 stop, the pitch of the candidate value is in increments of 1 stop which is larger than the above. The candidate values in the reference value table D1 are sequentially displayed in the luminance level selection column 60, for example, by an input such as a touch operation of the change button 61, 62 on the touch panel 215 or a depression operation of the selection button 212.

For example, the controller 80 refers to the reference value table D1 according to a user operation input to the operation receiver 210, to control display of the luminance level selection column 60. At this time, the converted value to IRE %, which is displayed together, is also updated so as to correspond to the candidate value displayed in the luminance level selection column 60. Such a converted value to IRE % may be calculated by the controller 180 based on information of the log gamma curve G1, or may be stored in advance in the flash memory 240 or the like in association with the reference value table D1 or the like.

The controller 180 determines whether or not the reference value selected by the user operation is 0 stop or more (S12).

When the reference value is 0 stop or more (YES in S12), the controller 180 receives a user operation for selecting a candidate value for the width in the operation receiver 210, to acquire the width value selected by the user operation (S13). FIG. 9 illustrates the width value table D2.

The width value table D2 is a table for managing candidate values for the width that can be selected in step S13. In the example of FIG. 9, the width value can be selected in increments of 0.2 stop within the range of "±0.2 stop" to "±1.0 stop". The user operation for selecting the width value can be implemented as, for example, an operation similar to the selection of the reference value, such as operating the change button 61, 62 after touching the displayed candidate value of the width. Also, the converted value to IRE % with respect to the width value s updated as needed as in the case of the reference value.

On the other hand, when the reference value is less than 0 stop (NO in S12), the controller 180 acquires, as the width value, a fixed value (for example, ±0.5 stop) set in advance (S14). A display example of step S14 is illustrated in FIG. 10. In step S14, since the user operation for selecting the width value is not particularly allowed to receive, the width value portion in the reference level selection column 60 is grayout-displayed.

When the reference value and the width value are acquired (S13, S14), the controller 180 determines whether or not an user operation for determining is input (S15). The user can input the user operation for determining by, for example, a touch operation on the determination button 63 displayed on the displays monitor 220 or a depression operation of the determination button 213.

The controller 180, when determining that the user operation for determining is not input (NO in S15), performs the processing from step S11 again.

On the other hand, the controller 180, when determining that the user operation for determining is out (YES in S15), stores setting information in the flash memory 240 so as to set the luminance level of the zebra pattern according to the acquired reference value and width value (S16). The setting information may be managed in units of the stop number, or may be managed in terms of IRE % units.

After setting the luminance level (S16), the controller 180 ends the processing of step S2 in FIG. 5.

According to the zebra setting process with the stop definition described above, the step size for selecting the reference value and the width value changes according to the characteristics of the log gamma curve G1.

Specifically, when the reference value is 0 stop or more, the reference value is enabled to be set more finely than when the reference value is less than 0 stop. By enabling to finely select a reference value of 0 stop or more, it is possible to improve the usability such as fine-tuning the display of the zebra pattern. In addition, as the range where the stop number is negative smallens the change in the luminance level (IRE %) with respect to the change in the stop number in the log gamma curve G1, the usability can be improved by not making the step size too fine.

3. Summary

As described above, in the present embodiment, the digital camera 100 that is an example of the imaging apparatus includes the image sensor 140 that is an example of the imager, the image processor 160, the display monitor 220 that is an example of the display, the operation receiver 210, and the controller 180. The image sensor 140 captures a subject image to generate an image signal. The image processor 160 performs predetermined processing on the image signal generated by the image sensor 140 to generate image data indicating an image. The display monitor 220 displays the zebra pattern 55 as an example of luminance level information showing the luminance level in the image. The operation receiver 210 inputs a user operation. The controller 180 controls the display monitor 220 and the operation receiver 210. The image processor 160 generates image data by using the log gamma curve G1. The log gamma curve G1 is an example of a predetermined gamma curve in which a light amount in the image signal is associated with a luminance level to compress as the light amount increases. The controller 180, when causing the operation receiver 210 to receive a user operation for setting the luminance level in the luminance level information, controls the display monitor 220 to represent the luminance level by the stop number indicating the corresponding light amount scaling rate in the log gamma curve G1.

According to the digital camera 100 described above, the luminance level to be set is presented according to the stop number without having to grasp detailed information on the log gamma curve G1, and the luminance level can be easily set. This can facilitate adjustments such as exposure adjustment in the log shooting mode of the digital camera 100.

In the present embodiment, the stop number indicates, in logarithm, the scaling rate by which in the log gamma curve G1, the corresponding light amount varies from a predetermined light amount corresponding to a middle gray such as 18% gray. As a result, the luminance level corresponding to the middle gray can be set at 0 stop, and the digital camera 100 can be easily adjusted. Various adjustments of the digital camera 100 can be performed by various user operations on the operation receiver 210.

In the present embodiment, in a case where the image processor 160 generates image data without using the log gamma curve G1 (NO in S1), the controller 180, when receiving the user operation for setting the luminance level, controls the display monitor 220 to represent the luminance level by IRE %, that is, a video signal output percentage. In this case, the presentation of the stop definition can be omitted.

In the present embodiment, in a case where the stop number is a predetermined value (for example, 0 stop) or more, the controller 180 causes the display monitor 220 to display the stop number with a smaller step size than a step size in a case where the stop number is less than the predetermined value (See FIGS. 8 and 9). This makes it possible to finely set the luminance level when the light amount is relatively large, and to facilitate adjustments such as exposure adjustment.

In the present embodiment, the controller 180, when receiving the user operation for setting a luminance level, controls the display monitor 220 to represent the luminance level by the stop number and the video signal output percentage (See FIG. 6A). This makes it easy for the user to understand the correspondence between the stop definition and the IRE % definition.

In the present embodiment, the predetermined gamma curve is a log gamma curve G1. According to the digital camera 100 of the present embodiment, it is possible to facilitate adjustment in shooting of compressed image data as the light amount becomes larger due to the characteristics of the log function.

In the present embodiment, the zebra pattern 55 as an example of the luminance level information emphatically shows, in the through image, an area corresponding to the luminance level set by the user operation. By using the stop definition for setting the luminance level in the zebra displaying function or the like, it is possible to facilitate various adjustments using the function.

Other Embodiments

As described above, the first embodiment has been described as an example of the technique disclosed in the present application. However, the technique in the present disclosure: is not limited to this, and can also be applied to embodiments in which changes, substitutions, additions, omissions, and the like have been made as appropriate. Further, it is also possible to combine the components described in the first embodiment to form a new embodiment. Accordingly, other embodiments will be exemplified below.

In the first embodiment described above, an example in which 0 stop is used for exposure adjustment in the log shooting mode has been described, but other than 0 stop may be used. For example, other than 0 stop may be used so that the user may empirically determine a subject to be matched with a predetermined number of stops (for example, 1 stop) or predict the stop number to be matched with a desired subject from the expectation of the final video work.

In the first embodiment, the example in which the luminance level is set with a width has been described. However, the present invention is not particularly limited to this. For example, a luminance level of an upper limit value or a lower limit value for displaying a zebra pattern may be set. For example, the lower limit value of the zebra pattern may be used to prevent overexposure such as setting 7 stops from the dynamic range of the digital camera 100.

In each of the above-described embodiments, the example in which the luminance level displaying function is used for exposure adjustment has been described. The idea of the present disclosure is not particularly limited to exposure adjustment, and can be applied to various adjustments in a shooting environment. For example, the zebra displaying function can be used when adjusting lighting such as various types of lighting in the shooting environment. In such a case, by using the user interface for setting the luminance level by the stop definition, the luminance level can be selected in units of stop, and it is possible for the user to facilitate adjustment of the lighting.

In each of the above embodiments, the zebra pattern 55 by the zebra displaying function is exemplified as an example of the luminance level information. However, the luminance level information is not particularly limited to this. As the luminance level information of this embodiment, for example, other emphasizing indication such as various patterns or various colors may be employed, instead of the zebra pattern 55. For example, coloring according to the luminance level may be performed like a so-called false color function. In addition, the idea of the present disclosure may be applied when the luminance level related to various luminance level information is set in the false color function, waveform display function, histogram display function, or the like, instead of the zebra displaying function, as the luminance level displaying function.

In each of the above embodiments, the log gamma curve G1 has been described as an example of the predetermined gamma curve. In the present embodiment, the predetermined gamma curve may not necessarily be the log gamma curve G1, but may be various gamma curves in which a light amount in the image signal is associated with a luminance level to compress as the light amount is larger.

In each of the embodiments described above, the display monitor 220 is illustrated as an example of the display. The display of the present embodiment is not limited to the display monitor 220, and may be, for example, an EVF (electronic viewfinder) or an output module of an HDMI (registered trademark) output signal or the like. Furthermore, the through image displayed on the display in the log shooting mode may be subjected to display processing in addition to the gamma processing, and may be applied with an LUT for display, for example. In this case, the above-described LUT may not be applied to the image data recorded as the shooting result, and a user-desired LUT can be applied at post-processing.

In each of the above embodiments, the digital camera 100 including the optical system 110 and the lens driver 120 is illustrated. The imaging apparatus of the present embodiment may not include the optical system 110 and the lens driver 120, and may be an interchangeable lens type camera, for example.

In each of the above embodiments, a digital camera has been described as an example of an imaging apparatus, the present invention is not limited to this. The imaging apparatus of the present disclosure may be an electronic device (for example, a video camera, a smartphone, a tablet terminal, or the like) having an image shooting function.

As described above, the embodiments have been described as examples of the technique in the present disclosure. For this purpose, the accompanying drawings and detailed description are provided.

Accordingly, among the components described in the accompanying drawings and the detailed description, not only the components essential for solving the problem, but also the components not essential for solving the problem may be included in order to illustrate the above technique. Therefore, it should not be immediately recognized that these non-essential components are essential as those non-essential components are described in the accompanying drawings and detailed description.

Moreover, since the above-mentioned embodiments are for demonstrating the technique in the present disclosure, various changes, substitutions, additions, omissions, and the like can be performed in a claim or its equivalent range.

INDUSTRIAL APPLICABILITY

The present disclosure is applicable to an imaging apparatus having an operation mode in which an imaging operation is performed by using a specific gamma curve such as a log shooting mode.

The invention claimed is:

1. An imaging apparatus, comprising:
an imager to capture a subject image to generate an image signal;
an image processor to perform predetermined processing on the image signal generated by the imager to generate image data indicating an image;
a display to display luminance level information showing a luminance level in the image;
an operation receiver to input a user operation; and
a controller to control the display and the operation receiver,
wherein the image processor generates the image data by using a predetermined gamma curve in which a light amount included in the image signal is associated with a luminance level to compress as the light amount increases,
wherein the controller, when causing the operation receiver to receive a user operation for setting a luminance level in the luminance level information, controls the display to represent the luminance level by a stop number indicating a scaling rate of a corresponding light amount in the gamma curve.

2. The imaging apparatus according to claim 1, wherein the stop number indicates, in logarithm, the scaling rate by which the corresponding light amount varies from a predetermined light amount in the gamma curve, the predetermined light amount corresponding to a middle gray.

3. The imaging apparatus according to claim 1, wherein in a case where the image processor generates the image data without using the predetermined gamma curve, the controller, when receiving the user operation for setting the luminance level, controls the display to represent the luminance level by a video signal output percentage.

4. The imaging apparatus according to claim 1, wherein in a case where the stop number is a predetermined value or more, the controller causes the display to display the stop number at a smaller step size than a step size in a case where the stop number is less than the predetermined value.

5. The imaging apparatus according to claim 1, wherein the controller, when receiving the user operation for setting the luminance level, controls the display to represent the luminance level by the stop number and a video signal output percentage.

6. The imaging apparatus according to claim 1, wherein the predetermined gamma curve is a log gamma curve.

7. The imaging apparatus according to claim 1, wherein the luminance level information emphatically shows, in the image, an area corresponding to the luminance level set by the user operation.

8. An imaging apparatus, comprising:
an imager to capture a subject image to generate an image signal;
an image processor to perform predetermined processing on the image signal generated by the imager to generate image data indicating an image;
a display to display luminance level information showing a luminance level in the image;
an operation receiver to input a user operation; and
a controller to control the display and the operation receiver,
wherein the image processor generates the image data by using a predetermined gamma curve in which a light amount included in the image signal is associated with a luminance level to compress as the light amount increases,
wherein the controller, when causing the operation receiver to receive a user operation for setting a luminance level in the luminance level information, controls the display to represent the luminance level by a stop number indicating a scaling rate of a corresponding light amount in the gamma curve,
wherein in a case where the image processor generates the image data without using the predetermined gamma curve, the controller, when receiving the user operation for setting the luminance level, controls the display to represent the luminance level by a video signal output percentage.

* * * * *